(12) United States Patent
Rosenqvist

(10) Patent No.: US 8,483,260 B2
(45) Date of Patent: Jul. 9, 2013

(54) COVARIANCE FACTOR MATRIX REUSE

(75) Inventor: Anders Rosenqvist, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 12/893,001

(22) Filed: Sep. 29, 2010

(65) Prior Publication Data

US 2012/0076248 A1   Mar. 29, 2012

(51) Int. Cl.
*H04B 1/00*   (2006.01)

(52) U.S. Cl.
USPC ........ 375/148; 375/347; 375/349; 455/67.11; 455/303; 370/252

(58) Field of Classification Search
USPC ................. 375/144, 148, 260, 267, 285, 346, 375/347, 349; 455/501, 63.1, 67.11, 67.13, 455/296, 303; 370/252, 317, 464, 465
See application file for complete search history.

(56) References Cited

U.S. PATENT DOCUMENTS

| | | | |
|---|---|---|---|
| 2001/0017883 A1* | 8/2001 | Tiirola et al. ................ | 375/148 |
| 2003/0012262 A1* | 1/2003 | Dias et al. .................... | 375/147 |
| 2006/0067383 A1 | 3/2006 | Cozzo et al. | |
| 2006/0072654 A1* | 4/2006 | Nielsen ........................ | 375/148 |
| 2007/0230546 A1* | 10/2007 | Moshavi et al. ............. | 375/150 |
| 2008/0063033 A1 | 3/2008 | Khayrallah | |
| 2009/0003415 A1* | 1/2009 | Bai et al. ...................... | 375/148 |
| 2010/0260237 A1* | 10/2010 | Jonsson ........................ | 375/148 |

FOREIGN PATENT DOCUMENTS

| | | |
|---|---|---|
| EP | 1447727 | 8/2004 |
| WO | 2008044989 A1 | 4/2008 |

OTHER PUBLICATIONS

Mailaender, L., "G-Rake Finger Placement in Time and Frequency Domains", Vehicular Technology Conference Fall (VTC 2009-Fall), 2009 IEEE 70th, IEEE, Piscataway, NJ, USA, Sep. 20, 2009, pp. 1-5, XP031600137.

Kutz, G, et al., Low complexity Implementation of a Downlink CDMA Generalized RAKE Receiver, Vehicular Technology Conference Proceedings, Vancouver, Canada, Sep. 24-28, 2002, IEEE Vehicular Technology Conference, New York, NY, IEEE, US, vol. 3, Sep. 24, 2002, pp. 1357-1361, XP010608650.

* cited by examiner

*Primary Examiner* — Dac Ha
(74) *Attorney, Agent, or Firm* — Coats & Bennett, P.L.L.C.

(57) ABSTRACT

A method and apparatus for reducing the computational load associated with computing weighting factors for wireless signals received at a wireless receiver is disclosed herein. The method and apparatus reuses a covariance factor matrix to compute multiple sets of weighting factors for multiple received signals. Particular embodiments factor a covariance matrix determined for a first received signal to determine a covariance factor matrix, and use the covariance factor matrix to determine a set of weighting factors for the first received signal as well as to determine additional sets of weighting factors for one or more additional received signals. The different received signals may be associated with different times, different channelization codes, and/or different frequencies. The weighting factors may be used to weight and combine received signals in a GRAKE receiver or chip equalizer. The weighting factors may also be used to determine a signal quality metric.

21 Claims, 5 Drawing Sheets

COVARIANCE FACTOR MATRIX REUSE

TECHNICAL FIELD

This disclosure relates generally to wireless receivers, and more particularly to updating weighting factors for interference-suppressing wireless receivers.

BACKGROUND

Conventional wireless receivers may use noise and/or data covariance information in the form of a covariance matrix to suppress interference in received signal(s), e.g., multiple sample sets of a single transmitted signal, multiple different signals, or any combination thereof. Such receivers generally determine weighting factors based on the covariance matrix, and suppress interference by using the weighting factors to weight and combine the received signals. Examples of such interference suppressing receivers include chip equalizers, RAKE receivers, Generalized RAKE (GRAKE) receivers, single-input multiple-output receivers, multiple-input multiple-output receivers, etc.

Interference-suppressing receivers require accurate calculation of the covariances in the covariance matrix to accurately suppress the interference. Calculating the covariances often requires highly complex computations. The ability to accurately compute such covariances is limited by the processing power of the receiver and/or the number of received signals being weighted and combined at any given time. Thus, the complex computations associated with computing the covariance matrix often places restrictions on the operation of the wireless receiver. The wireless industry therefore continues to look for ways to improve the operation of interference suppressing receivers.

SUMMARY

This disclosure relates to a method and apparatus for reducing the computational load associated with computing weighting factors for wireless signals received at a wireless receiver by reusing a covariance factor matrix to compute multiple sets of weighting factors for multiple received signals. Particular embodiments factor a covariance matrix determined for a first received signal to determine a covariance factor matrix, and use the covariance factor matrix to determine a set of weighting factors for the first received signal as well as to determine additional sets of weighting factors for one or more additional received signals. The different received signals may be received at different times, e.g., in different time slots, and/or may be associated with different channelization codes and/or frequencies.

One exemplary wireless receiver processor includes a covariance estimator and a weight estimator. The covariance estimator determines a covariance matrix for a first received signal, and factors the covariance matrix to determine a covariance factor matrix for the first received signal. The weight estimator computes a first set of weighting factors for the first received signal based on the covariance factor matrix. Further, the weight estimator reuses the covariance factor matrix to compute a second set of weighting factors for the second received signal. The exemplary processor may be part of a wireless receiver capable of processing multiple received signals, e.g., a GRAKE receiver, a chip equalizer, etc. It will be appreciated that the computed weighting factors may also be used to determine a signal quality metric.

DETAILED DESCRIPTION

The method and apparatus described herein factors a covariance matrix calculated for a first received signal, uses the resulting covariance factor matrix to compute a set of weighting factors for the first received signal, and reuses the covariance factor matrix to compute set(s) of weighting factors for one or more additional received signals. In so doing, the method and apparatus described herein reduces the computational load associated with determining different sets of weighting factors for different received signals, e.g., signals associated with different time slots, different channelization codes, and/or different frequencies. The following describes reusing the covariance factor matrix in terms of a GRAKE receiver. As noted below, however, reusing the covariance factor matrix as described herein may be implemented in any receiver relying on covariance-based weighting factor calculations, e.g., a receiver including a chip equalizer.

Figure 1:
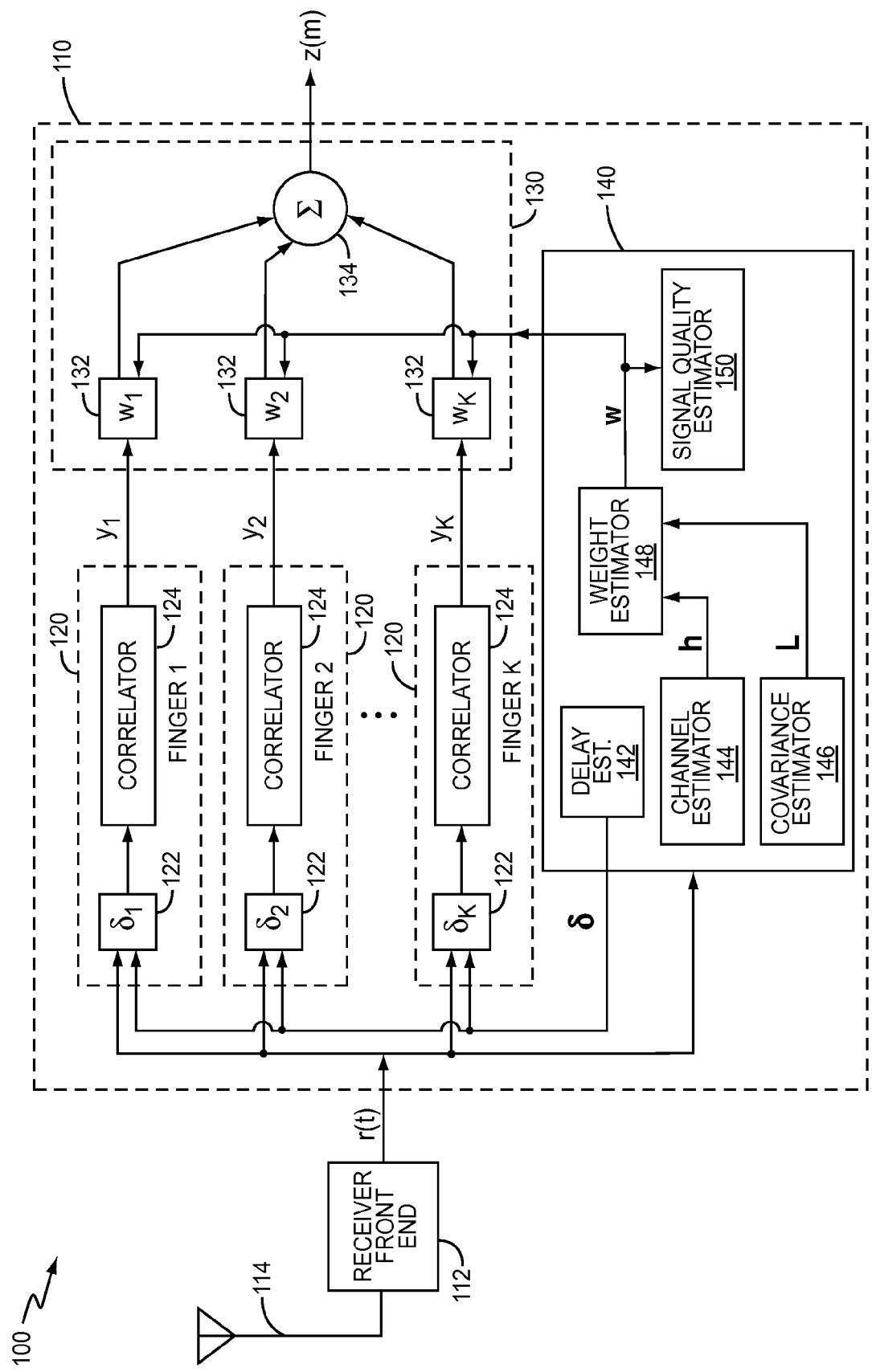
FIG. 1 shows a block diagram of one exemplary wireless receiver including a GRAKE receiver.

FIG. 1 illustrates a block diagram of a wireless receiver 100 comprising a GRAKE receiver 110, a receiver front end 112, and an antenna 114. Receiver front end 112 outputs received signals r(t) to GRAKE receiver 110. The received signals r(t) comprise one or more sets of sample values obtained from wireless signals received by one or more antennas 114 associated with one or more receiver front ends 112. An exemplary front end 112 may include amplifiers, filters, mixers, digitizers, and/or other electronics as needed to produce the sampled signal r(t) suitable for processing by the GRAKE receiver 110. In some embodiments, r(t) may also include components transmitted from different antennas (not shown).

Each received signal r(t) typically includes one or more sample sets arising from a signal arriving at the receiver 100, e.g., a signal associated with a particular time slot but arriving at the receiver from different directions and with different time delays. GRAKE receiver 110 combines the sample sets associated with received signal r(t) to generate a symbol estimate z(m) for the $m^{th}$ symbol period. More particularly, GRAKE receiver 110 delays, despreads, weights, and combines the received signal r(t) to estimate z(m). To that end, GRAKE receiver 110 comprises a plurality of RAKE fingers 120, a combiner 130, and a processor 140. RAKE fingers 120 process noise and data signals using a delay element 122 and a correlator 124 included in each RAKE finger 120. Delay elements 122 delay the received signal r(t) by an amount defined by processor 140. Correlators 124 correlate the delayed signals with a spreading code to produce a despread value y. The despread values $y=(y_1, y_2, \ldots, y_K)$ from correlators 124 are input to combiner 130.

Combiner 130 includes weighting elements 132 and summer 134. Weighting elements 132 receive and weight the despread signals y from RAKE fingers 120 with weighting factors $w(w_1, w_2, \ldots, w_K)$ determined by processor 140, as described further below. Summer 134 sums the weighted despread signals during each symbol period m to form a symbol estimate z(m).

The details of processor 140 are illustrated in terms of several functional blocks, which include a delay estimator 142, a channel estimator 144, a covariance estimator 146, and a weight estimator 148. Delay estimator 142 and channel estimator 144 respectively determine the delays $\delta=(\delta_1, \delta_2, \ldots, \delta_K)$ and channel estimates $h=(h_1, h_2, \ldots, h_K)$, for the RAKE fingers 120 using any known means. Covariance estimator 146 determines the covariance matrix R for the received signal r(t), e.g., from despread pilot symbols. Weight estimator 148 determines the weighting factors w as discussed herein. Processor 140 assigns the delays $\delta$ and weighting factors w to the RAKE fingers 120 and combiner 130, respectively. Processor 140 may optionally include a signal quality estimator 150 that determines a signal quality estimate for each received signal r(t) based on the corresponding weighting factors.

Equation (1) shows the relationship between the weighting factors w, covariance matrix R, and channel estimates h.

$$Rw=h, \quad (1)$$

where R is a covariance matrix of covariances that represent cross-correlations between RAKE fingers 120. To yield better numerical results when solving Equation (1) for the weighting factors w, the covariance matrix R may be factored into lower and upper triangular matrices using a Lower-Upper (LU) factorization (also known as an LU decomposition). For example, covariance estimator 146 may use the Cholesky LU factorization to represent the covariance matrix R as:

$$R=LL^H, \quad (2)$$

where L represents a lower triangular covariance factor matrix for R and $L^H$ represents the Hermitian of the covariance factor matrix, which is upper triangular. Equation (1) may therefore be rewritten as:

$$LL^H w=h. \quad (3)$$

While the embodiments described herein present the LU factorization in terms of the Cholesky factorization shown in Equation (2), those skilled in the art will appreciate that other LU factorizations may be used. For example, covariance matrix R may be factored according to:

$$R=LDL^H, \quad (4)$$

where L represents a unit lower triangular covariance factor matrix for R having entries of one on the diagonal, $L^H$ represents the Hermitian of the unit covariance factor matrix having entries of one on the diagonal, and D represents a diagonal covariance factor matrix having real, non-zero values along the diagonal. Further, it will be appreciated that covariance estimator 146 may alternatively supply weight estimator 148 with the covariance matrix R, and weight estimator 148 may factor the covariance matrix R to determine the covariance factor matrix L.

The lower and upper triangular matrices resulting from LU factorization enable weight estimator 148 to use triangular matrix substitution processes to solve Equation (3) for the weighting factors w. In particular, when Equation (3) is written as:

$$Lx=h, \quad (5)$$

where $x=L^H w$, the lower triangular properties of L enables weight estimator 148 to use a forwards substitution process to solve for an interim solution x. After solving for the interim solution x, the upper triangular properties of $L^H$ enables weight estimator 148 to use a backwards substitution process to solve $x=L^H w$ for w. It will be appreciated that the notation shown in Equation (6) below is generally used by various computational tools, e.g., Matlab, to represent such triangular substitution processes.

$$w=L^H \backslash L \backslash h \quad (6)$$

Accurately processing the received signal r(t) requires a sufficiently accurate set of weighting factors w, which in turn requires a sufficiently accurate covariance factor matrix L. Thus, covariance estimator 146 periodically updates the covariance factor matrix L. In conventional systems, a new covariance matrix R and covariance factor matrix L is determined for every received signal r(t), e.g., every time slot. The computational load associated with determining the covariance factor matrix L for each received signal r(t) may be problematic in some circumstances, e.g., in situations having a high update rate and/or in receivers having a large number of rake fingers 120. For example, the number of computations needed to factor a covariance matrix R is generally proportional to $K^3 f_r$, where K represents the number of RAKE fingers and $f_r$ represents the update rate. For systems having a large number of fingers, e.g., K>20 and/or a high update rate, e.g., $f_r$>1.5 kHz (once every time slot), the number of computations required to factor each covariance matrix may be undesirably high.

Figure 2:
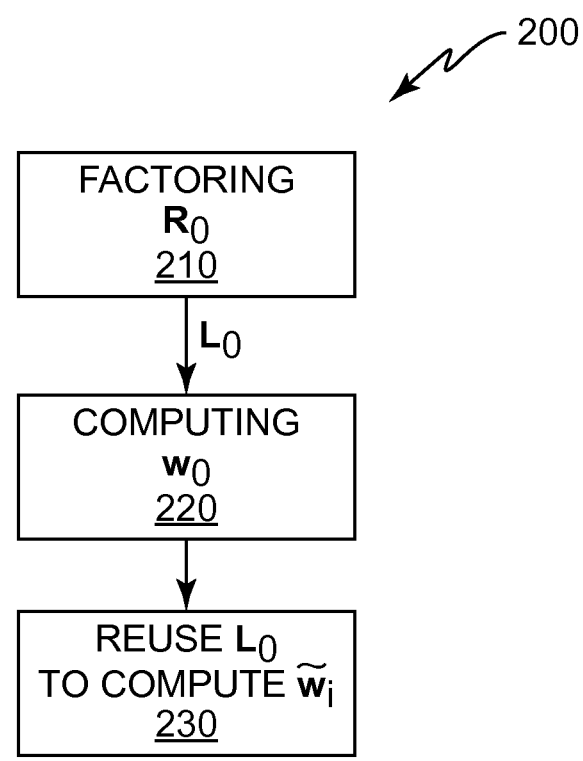
FIG. 2 shows a flow chart for a process for computing weighting factors according to one exemplary embodiment.

Particular embodiments reduce the computational load of processor 140 by reusing a covariance factor matrix determined for a first signal received in a first time slot to compute weighting factors for additional signals received over subsequent time slots. Reusing the covariance factor matrix in this manner reduces the frequency of the covariance matrix factorizations, and therefore, reduces the computational load associated with computing multiple sets of weighting factors. FIG. 2 shows one exemplary process 200 executed by processor 140 for computing the weighting factors. Covariance estimator 146 factors the covariance matrix $R_0$ determined for a first received signal $r_0(t)$ associated with a first time slot i=0 to determine a covariance factor matrix $L_0$ (block 210), and weight estimator 148 computes the set of weighting factors $w_0$ for the first received signal $r_0(t)$ based on the covariance factor matrix $L_0$ (block 220). The weight estimator 148 subsequently reuses the covariance factor matrix $L_0$ to approximate the set of weighting factors $\tilde{w}_i$ for a received signal $r_i(t)$ associated with a subsequent time slot i>0 (block 230). It will be appreciated that the subsequent time slot does not need to be adjacent to time slot i=0.

The following provides mathematical support for reusing the covariance factor matrix as described herein. First, for time slot i=0, the weighting factors may be computed by solving:

$$R_0 w_0 = L_0 L_0^H w_0 = h_0, \quad (7)$$

using triangular substitution processes according to:

$$w_0 = L_0^H \backslash L_0 \backslash h_0. \quad (8)$$

For time slot i, where i>0, the corresponding equation system $$R_i w_i = h_i \quad (9)$$

may be rewritten as:

$$(R_0 + \Delta \Delta R_i)(w_0 + \Delta w_i) = h_0 + \Delta h_i, \quad (10)$$

where $\Delta$ represents the change in the variable for time slot i>0 relative to time slot i=0, e.g., $\Delta R_i$ represents a covariance matrix update, $\Delta h$ represents a set of channel estimate updates, and $\Delta w_i$ represents a set of weighting factor updates for time slot i. Equation (10) may be expanded to:

$$R_0 w_0 + R_0 \Delta w_i + \Delta R_i w_0 + \Delta R_i \Delta w_i = h_0 + \Delta h_i, \quad (11)$$

which becomes Equation (12) after $R_0 w_0 = h_0$ is substituted into Equation (11).

$$R_0 \Delta w_i + \Delta R_i w_0 + \Delta R_i \Delta w_i = \Delta h_i. \quad (12)$$

Equation (12) may alternatively be written as:

$$R_0 \Delta w_i = \Delta h_i - \Delta R_i w_0 - \Delta R_i \Delta w_i. \quad (13)$$

In some embodiments, the term $\Delta R_i \Delta w_i$ may be considered negligible. In other embodiments, $\Delta R_i \Delta w_i$ may be approximated as $\Delta R_i \Delta w_{i-1}$, where $\Delta w_{i-1}$ represents a set of weighting factor updates for a third signal (i−1) processed after the first received signal (i=0) but before the second received signal (i). In either case, an approximate solution for Equation (13) may be defined by:

$$R_0 \Delta \tilde{w}_i = L_0 L_0^H \Delta \tilde{w}_i = \Delta \tilde{h}_i, \quad (14)$$

where $\Delta \tilde{h}_i$ represents a set of approximate channel estimate updates and may be represented by $\Delta \tilde{h}_i = \Delta h_i - \Delta R_i w_0$ when $\Delta R_i \Delta w_i$ is negligible, or $\Delta \tilde{h}_i = \Delta h_i - \Delta R_i \Delta w_{i-1}$ when $\Delta R_i \Delta w_i$ is approximated as $\Delta R_i \Delta w_{i-1}$. Thus, a set of approximate weighting factor updates $\Delta \tilde{w}_i$ may be determined by reusing the covariance factor matrix $L_0$ to solve Equation (14). The approximate weighting factors $\tilde{w}_i$ for the received signal associated with time slot i>0 may subsequently be determined according to:

$$\tilde{w}_i = w_0 \Delta \tilde{w}_i. \quad (15)$$

Simulations show that reusing the covariance factor matrix provides sufficiently accurate weighting factors over some limited reuse period. The length of the reuse period, e.g., the number of time slots where the covariance factor matrix may be successfully used/reused, generally depends on the wireless channel, the Doppler frequency, and/or the number of weighting factors (e.g., the number of RAKE fingers). Thus, processor 140 will repeat the method 200 of FIG. 2 when or just before the reuse period expires. The reuse period may be fixed in some embodiments. In other embodiments, the reuse period may be adaptively computed. For example, processor 140 may monitor $R_i \tilde{w}_i - h_i$ and end the reuse period when $R_i \tilde{w}_i - h_i$ exceeds some predetermined threshold.

Table 1 shows the differences (Δ) between "reuse" signal quality metrics and "reference" signal quality metrics. The "reuse" signal quality metrics comprise signal quality metrics, e.g., signal-to-noise ratios (SNRs), simulated based on weighting factors derived from a covariance factor matrix $L_0$ reused for one or more received signals (under the assumption that $\Delta R_i \Delta w_i$ may be approximated as $\Delta R_i \Delta w_{i-1}$), as shown in Equation (14). The "reference" signal quality metrics comprise signal quality metrics, e.g., SNRs, simulated based on weighting factors derived from a unique covariance factor matrix $L_0$ computed for each received signal. The simulations tracked the differences (Δ SNRs) between the "reuse" SNRs and the "reference" SNRs for 1500 time slots for different geometry factors, which e.g., are determined based on the total transmit power received by the wireless receiver divided by the total interference plus noise power at the wireless receiver, different numbers of RAKE fingers, different numbers of reuse, and different channel models, e.g., the Pedestrian B at 3 km/hr (PB3), Pedestrian A at 3 km/hr (PA3), and Vehicle A at 120 km/hr (VA120) channel models standardized by the 3GPP.

TABLE 1

Simulated ΔSNR Results

| Channel Model | Geometry Factor | #RAKE fingers | ΔSNR when reuse period is 3 time slots | ΔSNR when reuse period is 6 time slots | ΔSNR when reuse period is 9 time slots |
|---|---|---|---|---|---|
| PB3 | 20 dB | 24 | 0.004 dB | 0.019 dB | 0.05 dB |
| PB3 | 20 dB | 48 | 0.0095 dB | 0.038 dB | (5.3 dB) |
| PA3 | 10 dB | 16 | 0.0005 dB | 0.003 dB | 0.0075 dB |
| PA3 | 20 dB | 16 | 0.039 dB | 0.34 dB | (not feasible) |
| PA3 | 20 dB | 24 | 0.04 dB | 0.37 dB | (not feasible) |
| PA3 | 20 dB | 48 | 0.042 dB | 0.38 dB | (not feasible) |
| VA120 | 20 dB | 48 | (not feasible) | (not feasible) | (not feasible) |

As shown in Table 1, the SNRs (and therefore the weighting factors) are reasonably accurate for most of the simulated reuse periods. Further, Table 1 shows the covariance factor matrix $L_0$ may be reused longer, e.g., for more time slots, when the GRAKE receiver 110 utilizes fewer RAKE fingers 120. Further, while the PA3 channel model appears more sensitive to errors in the covariance factor matrix $L_0$, the PA3 channel generally requires fewer RAKE fingers 120 than the PB3 channel.

Figure 3:
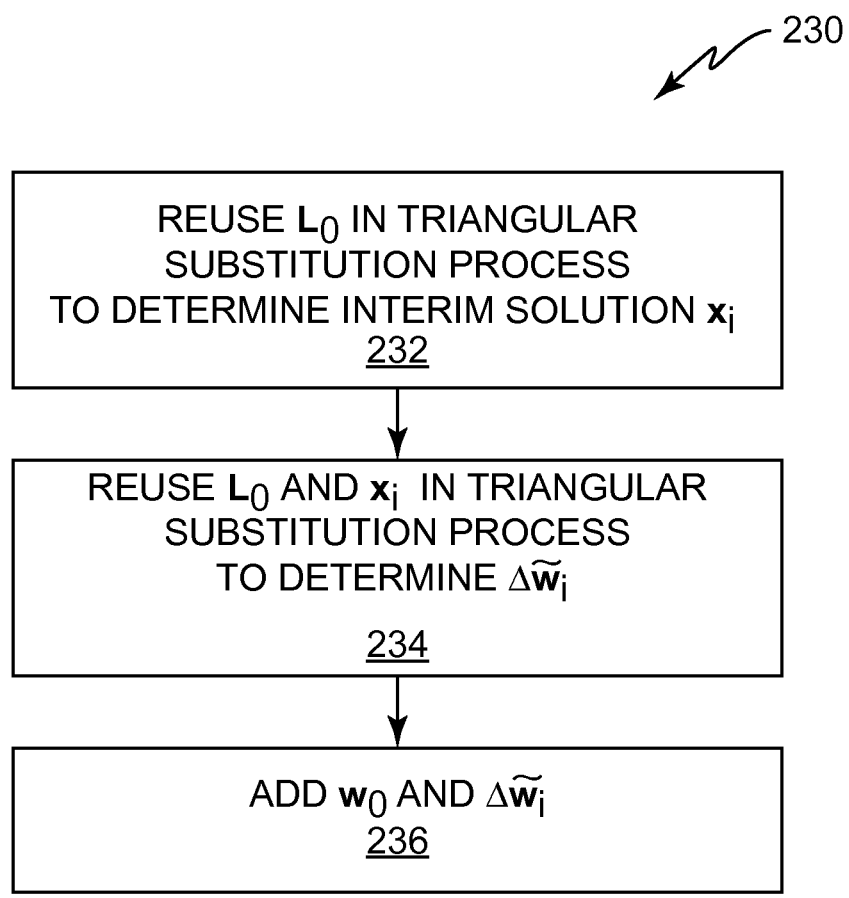
FIG. 3 shows a flow chart for the final step of the process of FIG. 2 according to one exemplary embodiment.

Equations (7)-(15) and Table 1 verify the viability and accuracy of reusing a covariance factor matrix for multiple received signals (e.g., time slots). Weight estimator 148 may reuse the covariance factor matrix in any number of ways to determine the different sets of weighting factors. FIG. 3, for example, shows one exemplary method 230 implemented by weight estimator 148 for reusing the covariance factor matrix $L_0$ to determine the weighting factors $\tilde{w}_i$ for subsequent time slots i>0. In this embodiment, weight estimator 148 executes multiple triangular matrix substitution processes to solve Equation (14) for the set of approximate weighting factor updates $\Delta \tilde{w}_i$. More particularly, weight estimator 148 reuses the covariance factor matrix $L_0$ as part of a triangular matrix substitution process (e.g., an upper triangular matrix substitution process) according to:

$$x_i \approx L_0 \backslash \Delta \tilde{h}_i \quad (16)$$

to compute an interim solution set $x_i$ (block 232). Subsequently, weight estimator 148 reuses the covariance factor matrix $L_0$ by using the Hermitian of the covariance factor matrix $L_0^H$ in another triangular matrix substitution process (e.g., a lower triangular matrix substitution process) according to:

$$\Delta \tilde{w}_i \approx L_0^H \backslash x_i \quad (17)$$

to approximate the set of weighting factor updates $\Delta \tilde{w}_i$ (block 234). The weight estimator 148 adds the set of approximate weighting factor updates $\Delta \tilde{w}_i$ to the set of weighting factors $w_0$ computed for the signal from time slot i=0 to estimate the set of weighting factors $w_i$ for the received signal $r_i(t)$ associated with time slot i>0 (block 236).

Figure 4:
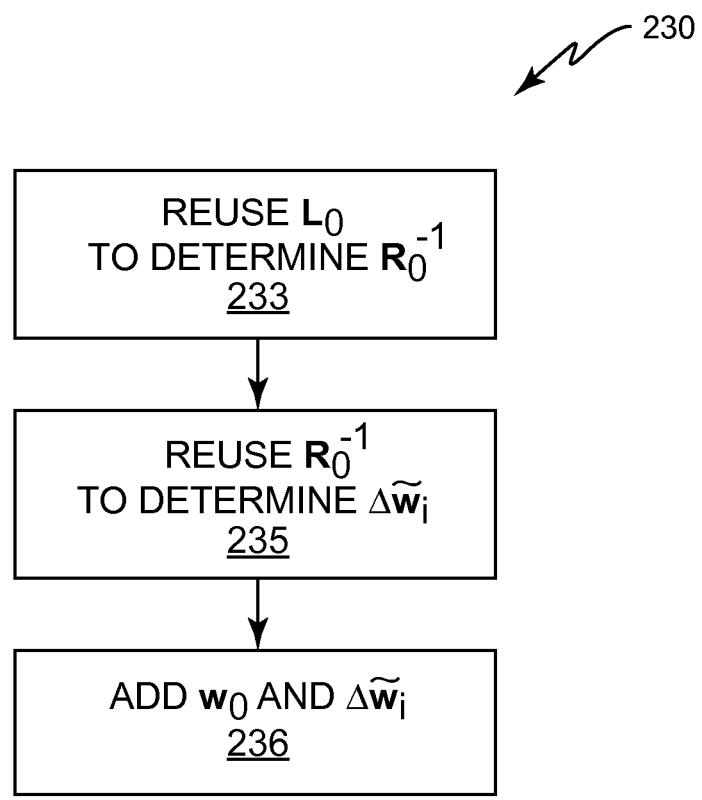
FIG. 4 shows a flow chart for the final step of the process of FIG. 2 according to another exemplary embodiment.

FIG. 4 shows another exemplary method 230 for reusing the covariance factor matrix $L_0$ to compute a set of weighting factors $\tilde{w}_i$ for a subsequent time slot. In this embodiment, weight estimator 148 reuses the covariance factor matrix $L_0$ as part of a matrix inversion process to solve Equation (14) for the set of approximate weighting factor updates $\Delta \tilde{w}_i$. More particularly, weight estimator 148 reuses the covariance factor matrix $L_0$ according to:

$$R_0^{-1} = (L^H)^{-1} L_0^{-1} \quad (18)$$

to compute the inverse of the covariance matrix $R_0^{-1}$ (block 233). It will be appreciated that covariance estimator 146 may alternatively reuse the covariance factor matrix $L_0$ to compute $R_0^{-1}$. In any event, $R_0^{-1}$ is stored in memory (not shown) to enable weight estimator 148 to reuse the inverse of the covariance matrix $R_0^{-1}$ for a subsequent time slot i>0 according to:

$$\Delta \tilde{w}_i \approx R_0^{-1} \Delta \tilde{h}_i \qquad (19)$$

to determine the set of approximate weighting factor updates $\Delta \tilde{w}_i$ (block 235). The weight estimator 148 adds the set of approximate weighting factor updates $\Delta \tilde{w}_i$ to the set of weighting factors $w_0$ computed for the signal from time slot i=0 to estimate the set of weighting factors $\Delta \tilde{w}_i$ for the received signal $r_i(t)$ associated with time slot i>0 (block 236).

While the above describes reusing the covariance factor matrix in terms of different received signals associated with different time slots, it will be appreciated that the covariance factor matrix $L_0$ may be reused for multiple received signals generally associated with different covariance matrices, e.g., signals associated with different time slots, different channelization codes, different OFDM subcarrier frequencies, and/or different WCDMA carriers. For example, the reuse process described herein may be applied to a code-specific receiver, where a covariance factor matrix $L_0$ computed for a received signal associated with a first channelization code is reused for additional received signals associated with different channelization codes. It will be appreciated that signals associated with different channelization codes may be received in the same or different time slots. In this case, the subscript i used in Equation (10) corresponds to the received signal associated with the $i^{th}$ channelization code. In other words, $w_0$ represents the set of weighting factors calculated for the received signal $r_0(t)$ corresponding to channelization code i=0, and $w_i$ represents the set of weighting factors calculated for the received signal $r_i(t)$ corresponding to channelization code i>0. Using the same principles discussed above, and in this case neglecting $\Delta R_i \Delta w_i$, the weighting factors $\Delta \tilde{w}_i$ for the received signal $r_i(t)$ corresponding to channelization code i>0 may be computed according to:

$$\Delta \tilde{w}_i = w_0 + \Delta \Delta \tilde{w}_i = w_0 + L_0^H \backslash L_0 \backslash (\Delta h_i - \Delta R_i w_0), \qquad (20)$$

which generally corresponds to the solution disclosed above in Equations (14) and (15).

Figure 5:
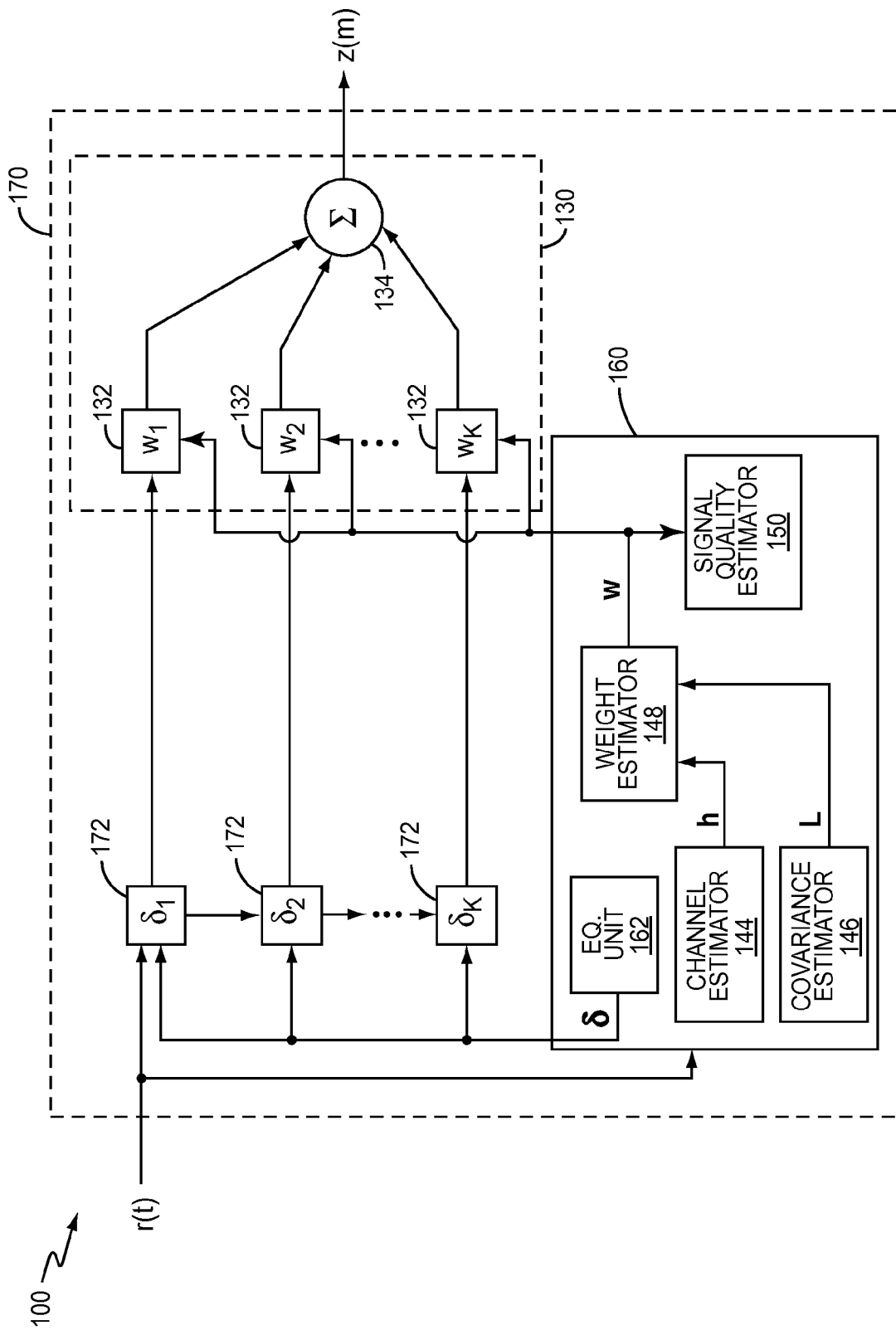
FIG. 5 shows a block diagram of one exemplary wireless receiver including a chip equalizer.

The covariance factor matrix reuse described herein is also not limited to GRAKE receivers, and may in fact be used to estimate weighting factors for other receivers that process a received signal having multiple sample sets. For example, a chip equalizer may also reuse the covariance factor matrix as described herein. FIG. 5 shows an exemplary chip equalizer 170 that may be included in a wireless receiver, e.g., may replace the GRAKE receiver 110 in the wireless receiver 100 of FIG. 1. In addition to the combiner 130 and processor 160, chip equalizer 170 includes a plurality of successive delay elements 172. Equalizer unit 162 computes a plurality of delays 8, and weight estimator 148 determines a set of weighting factors w based on the received signal r(t), the channel estimates h, and the covariance factor matrix $L_0$. As described herein, the weight estimator 148 may reuse the covariance factor matrix $L_0$ for multiple received signals, e.g., signals corresponding to different time slots, different channelization codes, etc. Delay elements 172 successively delay the received signal r(t) according to the computed delays 8. Weighting elements 132 in combiner 130 weight the successively delayed samples according to the weighting factors w. Summer 134 combines the weighted samples to produce the estimated output sample z(m). When receiver 100 receives one or more additional signals, the weight estimator 148 computes additional sets of weighting factors w based on the covariance factor matrix $L_0$ computed for the first received signal. The optional signal quality estimator 150 may also determine signal quality estimates, eg., SNRs, for one or more received signals based on the corresponding weighting factors.

Reusing the covariance factor matrix as described herein reduces the computational load associated with determining multiple sets of weighting factors for multiple received signals, e.g., signals received in different time slots, signals having different channelization codes, etc., while maintaining the desired level of accuracy in the resulting combining weights. These computational savings provide many advantages over conventional systems. For example, reusing the covariance factor matrix as described herein may reduce the computational load of the processor 140 for a given number of RAKE fingers or chip delays, and/or may increase the update rate for a given processing power and a given number of RAKE fingers, chip delays, etc. Further, the computational savings provided by reusing the covariance factor matrix $L_0$ may enable the number RAKE fingers, chip delays, etc., to be increased without increasing the computational load of the receiver 100. For example, for a specific processor it may take approximately 0.22 $K^3$ clock cycles to compute a covariance factor matrix $L_0$ for K RAKE fingers and 1.2 $K^2$ clock cycles to solve the system of equations using the covariance factor matrix $L_0$. Reusing the covariance factor matrix $L_0$ for n–1 time slots such that a new covariance factor matrix $L_0$ is only computed every $n^{th}$ time slot saves 0.22(n–1) $K^3$ clock cycles for each set of n time slots. The number of "reuse" RAKE fingers $K_r$ allowed for a particular reuse scenario (e.g., every n time slots) relates to the number of "conventional" RAKE fingers $K_c$ allowed when the covariance factor matrix $L_0$ is not reused according to:

$$n(0.22K_c^3 + 1.2K_c^2) = 0.22K_r^3 + 1.2nK_r^2. \qquad (21)$$

For example, assume the receiver 100 allows a maximum of $K_c$=32 RAKE fingers when the covariance factor matrix $L_0$ is computed for every time slot. If the covariance factor matrix $L_0$ is reused for 4 more time slots (e.g., n=5), $K_r$=48 RAKE fingers may be used without increasing the computational load of the receiver 100. If the covariance factor matrix $L_0$ is reused for 8 more time slots (e.g., n=9), $K_r$=56 RAKE fingers may be used without increasing the computational load of the receiver 100.

It will be appreciated that factoring the covariance matrix may induce a peak computational load in the processor 140. However, when the data symbol processing is relatively insensitive to delays, the computational load associated with factoring the covariance matrix may be spread over multiple time slots of a reuse period. The remaining slots of the reuse period may be used to perform weighting factor computations, the corresponding combining, and/or any subsequent receiver processing.

Furthermore, those skilled in the art will appreciate that the functions illustrated in FIG. 1 and FIG. 5 may be implemented using a variety of programmable devices, digital hardware, or combinations thereof. The processor 140, 160 may in various embodiments, comprise one or several microprocessors, microcontrollers, digital signal processors, and the like, each of which may be configured with appropriate software and/or firmware to carry out all or parts of the various functions illustrated in FIGS. 1 and 5, and may further comprise digital hardware blocks configured to carry out all or parts of those various signal processing tasks. The processor 140, 160 may be implemented with one or more application-specific integrated circuits (ASICs), off-the-shelf digital and analog hardware components, or some combination of ASICs and off-the-shelf hardware.

Reusing the covariance factor matrix as described herein may, of course, be carried out in other ways than those specifically set forth herein without departing from essential characteristics of the factor reuse. The present embodiments are to be considered in all respects as illustrative and not restrictive, and all changes coming within the meaning and equivalency range of the appended claims are intended to be embraced therein.

What is claimed is:

1. A method of computing weighting factors for wireless signals received at a wireless receiver, the method comprising:
    factoring a covariance matrix determined for a first received signal to determine a covariance factor matrix for the first received signal;
    determining a first set of weighting factors for the first received signal based on the covariance factor matrix; and
    reusing the covariance factor matrix to determine a second set of weighting factors for a second received signal by:
        determining a set of weighting factor updates for the second received signal based on the covariance factor matrix; and
        adding the first set of weighting factors to the set of weighting factor updates to determine the second set of weighting factors.

2. The method of claim 1 wherein determining the set of weighting factor updates comprises executing a triangular matrix substitution process based on the covariance factor matrix to determine the set of weighting factor updates.

3. The method of claim 2 wherein executing the triangular matrix substitution process comprises:
    determining a covariance matrix update based on a difference between the covariance matrix determined for the first received signal and a covariance matrix determined for the second received signal;
    determining a set of channel estimate updates for the second received signal based on a first set of channel estimates derived from the first received signal, a second set of channel estimates derived from the second received signal, the first set of weighting factors, and the covariance matrix update;
    executing a first triangular matrix substitution process based on the covariance factor matrix and the set of channel estimate updates to determine an interim solution set; and
    executing a second triangular matrix substitution process based on the interim solution set and the Hermitian of the covariance factor matrix to determine the set of weighting factor updates.

4. The method of claim 3 further comprising estimating a set of weighting factor updates for a third received signal processed after the first received signal but before the second received signal, wherein estimating the set of channel estimate updates comprises further estimating the set of channel estimate updates based on the set of weighting factor updates estimated for the third received signal.

5. The method of claim 1 wherein determining the set of weighting factor updates comprises:
    computing an inverse covariance matrix based on the covariance factor matrix; and
    computing the set of weighting factor updates based on the inverse covariance matrix.

6. The method of claim 1 wherein the first and second received signals are associated with different times.

7. The method of claim 6 wherein the first and second received signals are associated with different time slots.

8. The method of claim 1 wherein the first and second received signals are associated with different channelization codes.

9. The method of claim 1 wherein the first and second received signals are associated with different times and different channelization codes.

10. The method of claim 1 wherein the first and second received signals are associated with different OFDM subcarrier frequencies or different WCMDA carriers.

11. The method of claim 1 wherein the wireless receiver comprises a GRAKE receiver, and wherein the method further comprises weighting despread values of the first received signal using weighting factors from the first set of weighting factors, and weighting despread values of the second received signal using weighting factors from the second set of weighting factors.

12. The method of claim 1 wherein the wireless receiver comprises a chip equalizer, and wherein the method further comprises weighting delayed values of the first received signal using weighting factors from the first set of weighting factors, and weighting delayed values of the second received signal using weighting factors from the second set of weighting factors.

13. The method of claim 1 further comprising computing a first signal quality metric for the first received signal based on the first set of weighting factors, and computing a second signal quality metric for the second received signal based on the second set of weighting factors.

14. A wireless receiver processor configured to compute weighting factors for wireless signals received at a wireless receiver, the processor comprising:
    a covariance estimator configured to determine a covariance matrix for a first received signal, and to factor the covariance matrix to determine a covariance factor matrix for the first received signal; and
    a weight estimator configured to:
        compute a first set of weighting factors for the first received signal based on the covariance factor matrix; and
        reuse the covariance factor matrix to compute a second set of weighting factors for a second received signal by:
            determining a set of weighting factor updates for the second received signal based on the covariance factor matrix; and
            adding the first set of weighting factors to the set of weighting factor updates to determine the second set of weighting factors.

15. The processor of claim 14 wherein the weight estimator determines the set of weighting factor updates by executing a triangular matrix substitution process based on the covariance factor matrix to determine the set of weighting updates.

16. The processor of claim 15 wherein the covariance estimator 146 is further configured to determine a covariance matrix update based on a difference between the covariance matrix determined for the first received signal and a covariance matrix determined for the second received signal, wherein the processor further comprises a channel estimator configured to determine a first set of channel estimates for the first received signal and a second set of channel estimates for the second received signal and to estimate a set of channel estimate updates for the second received signal based on the first and second sets of channel estimates, the covariance matrix update, and the first set of weighting factors, and wherein the weight estimator executes the triangular matrix substitution process by:

executing a first triangular matrix substitution process based on the covariance factor matrix and the set of channel estimate updates to determine an interim solution set; and executing a second triangular matrix substitution process based on the interim solution set and the Hermitian of the covariance factor matrix to determine the set of weighting factor updates.

17. The processor of claim 16 wherein the weight estimator further estimates a set of weighting factor updates for a third received signal processed after the first received signal but before the second received signal, and wherein the channel estimator further estimates the set of channel estimate updates by estimating the set of channel estimate updates based on the set of weighting factor updates estimated for the third received signal.

18. The processor of claim 14 wherein one of the covariance estimator and the weight estimator is further configured to compute an inverse covariance matrix based on the covariance factor matrix, and wherein the weight estimator determines the set of weighting factor updates by computing the set of weighting factor updates based on the inverse covariance matrix.

19. A GRAKE receiver including the processor of claim 14, wherein the first and second sets of weighting factors comprise first and second sets of GRAKE combining weights, respectively.

20. A chip equalizer including the processor of claim 14, wherein the first and second sets of weighting factors comprise first and second sets of tap combining weights, respectively.

21. The processor of claim 14 further comprising a signal quality estimator configured to compute a first signal quality metric for the first received signal based on the first set of weighting factors and to compute a second signal quality metric for the second received signal based on the second set of weighting factors.

* * * * *

UNITED STATES PATENT AND TRADEMARK OFFICE
CERTIFICATE OF CORRECTION

PATENT NO. : 8,483,260 B2
APPLICATION NO. : 12/893001
DATED : July 9, 2013
INVENTOR(S) : Rosenqvist It is certified that error appears in the above-identified patent and that said Letters Patent is hereby corrected as shown below:

In the Specifications

In Column 2, Line 61, delete "w($w_1$, $w_2$, ... , $w_K$)" and insert -- w=($w_1$, $w_2$, ... , $w_K$) --, therefor.

In Column 3, Line 8, delete "delays 8" and insert -- delays $\delta$ --, therefor.

In Column 4, Line 56, in Equation (10), delete "($R_0+\Delta\Delta R_i$)($w_0+\Delta w_i$)=$h_0+\Delta h_i$," and insert -- ($R_0+\Delta R_i$)($w_0+\Delta w_i$)=$h_0+\Delta h_i$, --, therefor.

In Column 5, Line 15, delete " $\Delta \tilde{h}_i = \Delta h_i - \Delta R_i \Delta w_{i-1}$ " and insert -- $\Delta \tilde{h}_i = \Delta h_i - \Delta R_i w_0 - \Delta R_i \Delta w_{i-1}$ --, therefor.

In Column 5, Line 15, in Equation (15), delete " $\tilde{w}_i = w_0 \Delta \tilde{w}_i$ " and insert -- $\tilde{w}_i = w_0 + \Delta \tilde{w}_i$ --, therefor.

In Column 5, Line 37, delete "(A)" and insert -- ($\Delta$) --, therefor.

In Column 6, Line 52, delete " $w_i$ " and insert -- $\tilde{w}_i$ --, therefor.

In Column 7, Line 10, delete " $\Delta \tilde{w}_i$ " and insert -- $\tilde{w}_i$ --, therefor.

In Column 7, Line 34, delete " $\Delta \tilde{w}_i$ " and insert -- $\tilde{w}_i$ --, therefor.

In Column 7, Line 38, in Equation (20), delete " $\Delta \tilde{w}_i = w_0 + \Delta \Delta \tilde{w}_i$ " and insert -- $\tilde{w}_i = w_0 + \Delta \tilde{w}_i$ --, therefor.

Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,483,260 B2

In the Claims

In Column 10, Line 9, in Claim 10, delete "WCMDA" and insert -- WCDMA --, therefor.

In Column 10, Line 55, in Claim 16, delete "estimator 146" and insert -- estimator --, therefor.